United States Patent [19]
Kennelly

[11] 3,785,500
[45] Jan. 15, 1974

[54] BICYCLE RACK
[76] Inventor: Cleve F. Kennelly, 500 N. 87th Way, Scottsdale, Ariz. 85253
[22] Filed: Apr. 27, 1972
[21] Appl. No.: 248,130

[52] U.S. Cl............................ 211/5, 70/235, 211/21
[51] Int. Cl............................................... B62h 5/00
[58] Field of Search ..................... 211/5, 17, 20, 21, 211/22, 18, 19, 178 R; 70/234, 233

[56] References Cited
UNITED STATES PATENTS
1,202,444  10/1916  Soleau ............................. 70/234 X
1,718,828   6/1929  Murphy ................................. 211/5

FOREIGN PATENTS OR APPLICATIONS
4,801  1/1898  Great Britain ....................... 211/20
993,285  10/1951  France ................................ 211/20
1,553,133  12/1968  France ................................ 211/20
152,938  1/1956  Sweden ............................ 211/178 R Primary Examiner—Roy D. Frazier
Assistant Examiner—Richard L. Stroup

[57] ABSTRACT

A bicycle and the like rack including, when erected, a plurality of arcuate slots for holding bicycles in an upright side-by-side relationship with a wheel thereof engaged in the slots. The rack is foldable to a collapsed, flat condition for storage or transporting and means are provided for locking bicycles in the rack.

6 Claims, 3 Drawing Figures

PATENTED JAN 15 1974   3,785,500

BICYCLE RACK

BACKGROUND OF THE INVENTION

While racks have heretofore been provided for holding of bicycles and the like, they have not been completely satisfactory from the standpoint of operational use and the ability to be collapsed into an entirely flat storage or transporting condition wherein the unit is compact and can be made from light weight materials to facilitate easy movement from place to place.

An object of the present invention is to provide a bicycle or the like rack which overcomes drawbacks of previous constructions and provides an optimal construction.

SUMMARY OF THE INVENTION

The invention is a bicycle and the like rack which includes structure defining a plurality of sidewise spaced slots having the upper ends arcuately closed and with the slots being adapted for holding bicycles in an upright, side-by-side relationship with a wheel thereof engaged in the slot. The structure is such that the rack can be easily folded into an entirely flat, compact unit which, coupled with the use of lightweight materials, can be easily moved from place to place. The foldability is accomplished by pivotally interconnecting the structures defining the slots and the slots at their bases are connected to longitudinally extending members which are adapted in an erected position of the rack to be interconnected by U-shaped members to form a rigid, upstanding structure with the slots as erected being slanted for ease of insertion of the bicycle wheel. By use of a single bar padlocked on one end, all bicycles may be securely locked in place.

Additional objects, advantages and features of the invention will be more readily apparent from the following detailed description of an embodiment thereof when taken together with the accompanying drawings in which.

Figure 1:
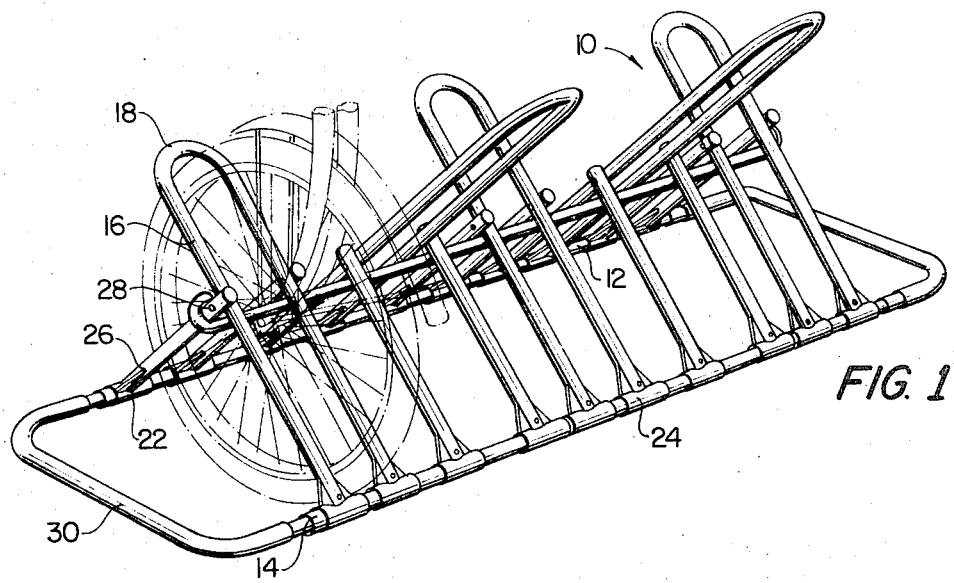
FIG. 1 is a perspective view of the rack of the invention in an erected position and showing a bicycle positioned therein in phantom lines and additionally showing a locking rod operatively attached.

Referring now in more detail to the drawings, the rack generally designated 10 includes longitudinal base members 12 and 14 to which are respectively attached and mounted a plurality of arcuate or U-shaped wheel receiving members or slots 16 closed at their tops to form upper closed arcuate ends 18. It is noted that the members 16 are alternately arranged with respect to bases 24 and 22 thereof attached respectively to longitudinal members 14 and 12. The attachment as shown in the drawings is accomplished by means of T-shaped brackets although any suitable connection could be used. The combinations of longitudinal members, slots and bases form in essence a first rack half and a second rack half.

The slot forming members 16 on the halves are disposed in such a manner that when the rack is erected they are slanted in opposite directions. This permits a greater number of bicycles to be associated with the rack without handle bar interference. Struts or brace members 26 are attached at one end to the longitudinal members 12 and 14 and extend therefrom on opposite sides of the slots 16 attached to the other respective longitudinal member. These struts can be mounted in a manner similar to the members 16. At their free ends 28 the struts 26 are pivotally attached to the legs of the arcuate slot shaped members 16 by bolts or the like.

Figure 2:
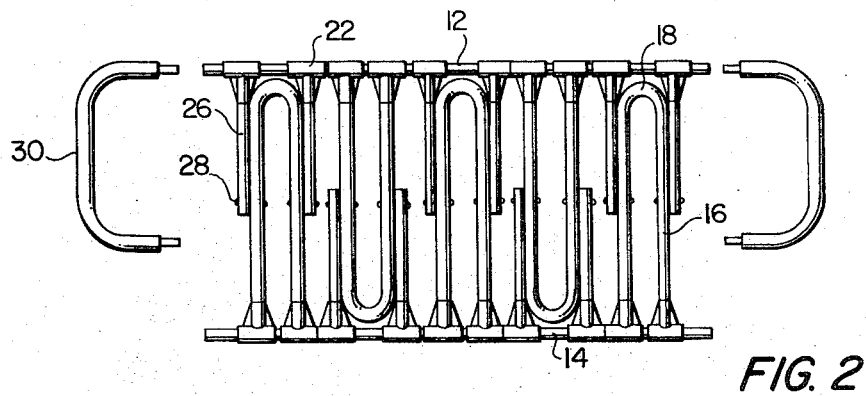
FIG. 2 is a top plan view of the rack in collapsed position with end members removed.
Figure 3:
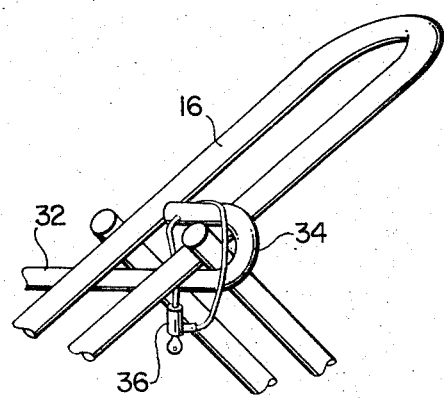
FIG. 3 is a fragmentary perspective view of an end of the rack showing in greater detail the locking structure and function.

The lengths of the members 16 and 26 and the pivot points of interconnection are such that the two halves of the rack can be pivoted to a folded or collapsed position as shown in FIG. 2. The pivot points of the interconnection between the struts and arcuate shaped members are so arranged to permit this collapsing with the struts and arcuate shaped members being interleaved and the outer ends thereof terminating short of the longitudinal members. When it is desired to erect the rack to a position or condition for positioning bicycle wheels therein, the two halves of the rack are pivoted with respect to one another to the position shown in FIG. 1, and U-shaped end members 30 shown in removed condition in FIG. 2 are placed in interconnecting engagement with the longitudinal members 12 and 14 as shown in FIG. 1. The lengths of the members 30 is such that the optimal sloping or slanted position of the wheel engaging slot is obtained as shown in FIG. 1 for easy placement of a bicycle wheel and stable positioning of the bicycle. In one preferred embodiment, the length of the slots are approximately 27 inches and their widths approximately 2 ½ inches. The spacing can be altered as desired to accommodate different types or sizes of bicycles and the like.

The rack also includes a removable locking feature consisting of a single longitudinally extended bar 32 which is hook or U-shaped at its end 34 and which can be provided with a hole therein, and having a hole at the opposite end. To lock the wheels of bicycles in the rack, the bar 32 is positioned below the pivotal attachment of the struts and arcuate slot shaped members and between the spokes of the various bicycles with the hook engaged with either a strut or a leg of an arcuate slot shaped member, and a lock 36 is attached by interengaging a said hole and extending around a leg of the end member 16. The single bar accordingly will lock all of the bicycles in the rack and can be easily removed to free the bicycles.

The locking device can engage either through the bicycle frame or wheel and preferably is formed at the end opposite the lock with the hook to attach to the rack. Provisions can be made for attaching to a fence, dwelling or with attaching poles which can be embedded in concrete.

Manifestly, minor changes in details of construction and dimensions can be effected without departing from the spirit and scope of the invention as defined in and limited solely by the appended claims.

I claim:

1. A bicycle rack including:
   A. a first rack half and a second rack half;
   B. the halves respectively including:
      i. a longitudinal base member;
      ii. at least one inverted U-shaped member having leg portions with the ends thereof attached to said base member, and an upper closed arcuate end, said U-shaped member defining an arcuate slot engageable by a bicycle wheel; and iii. a brace strut connected at one end thereof to said base member;

C. said brace struts on each half being pivotally connected to a median position of a said leg portion of each U-shaped member on the other said half;

D. said halves being pivotable selectively with respect to one another to an erected position for retaining a bicycle in a standing position by engagement of a wheel thereof in said arcuate slot, and to a collapsed position;

E. the pivotal connections of said struts and said leg portions being such that in a collapsed position said strut and said U-shaped member are interleaved between each other and the ends thereof terminating short of said longitudinal strut with both halves lying flat in a common plane for storage and transportation.

2. A rack as claimed in claim 1, wherein a plurality of U-shaped members defining said arcuate slots and struts are attached along each said longitudinal base member, said U-shaped members attached to one said longitudinal base member of one said half being staggered with respect to said U-shaped members connected to the said longitudinal base member of the other said half.

3. A rack as claimed in claim 2, said longitudinal base members being adapted to support a rack in the erected position, and removable U-shaped members interconnecting ends of said longitudinal base members of said first and second halves in the erected position of said rack to form a rigidified structure.

4. A rack as claimed in claim 3, including a removable longitudinal locking bar insertable below the pivotal connections of said U-shaped members with said struts on the respective halves of said rack in the erected position and through portions of bicycles disposed in said arcuate slots, and detachable means for securing an end of said longitudinal locking bar to one said U-shaped member leg portion whereby all bicycles positioned in said rack will be locked against removal.

5. A rack as claimed in claim 4, said locking bar having a hook at an end thereof, said hook being adapted to engage around a U-shaped member leg portion at one end of said rack, the opposite end of said locking bar having a hole therethrough, and said detachable means comprises a removable lock insertable through said hole and around a said U-shaped member leg portion for locking the locking bar and thereby the bicycles in said rack.

6. A rack as claimed in claim 5, wherein said U-shaped members and said struts are disposed at an inward inclined angle on each rack half with respect to a supporting surface on which said rack in erected position is mounted.

* * * * *